United States Patent
Gartner et al.

(10) Patent No.: US 8,935,312 B2
(45) Date of Patent: Jan. 13, 2015

(54) AGGREGATION OF MULTIPLE INFORMATION FLOWS WITH INDEX PROCESSING

(75) Inventors: Jeffrey G. Gartner, Hopewell Junction, NY (US); Colm Smyth, Foxrock (IE)

(73) Assignee: Avaya Inc., Basking Ridge, NJ (US)

( * ) Notice: Subject to any disclaimer, the term of this patent is extended or adjusted under 35 U.S.C. 154(b) by 675 days.

(21) Appl. No.: 12/566,497

(22) Filed: Sep. 24, 2009

(65) Prior Publication Data

US 2011/0072067 A1    Mar. 24, 2011

(51) Int. Cl.
*G06F 15/16* (2006.01)
*H04L 29/06* (2006.01)
*G06Q 10/10* (2012.01)

(52) U.S. Cl.
CPC ............ *H04L 65/1063* (2013.01); *G06Q 10/10* (2013.01); *H04L 65/4015* (2013.01)
USPC ............ 709/201; 709/217; 386/220; 386/248

(58) Field of Classification Search
USPC ....................................................... 709/201
See application file for complete search history.

(56) References Cited

U.S. PATENT DOCUMENTS

| | | | |
|---|---|---|---|
| 6,944,651 B2* | 9/2005 | Onyon et al. | 709/217 |
| 2001/0004766 A1* | 6/2001 | Koyama | 717/4 |
| 2003/0036911 A1* | 2/2003 | Morin | 705/1 |
| 2003/0174826 A1* | 9/2003 | Hesse | 379/210.01 |
| 2006/0149558 A1* | 7/2006 | Kahn et al. | 704/278 |
| 2008/0260350 A1* | 10/2008 | Cooper | 386/84 |

* cited by examiner

*Primary Examiner* — Hua Fan
(74) *Attorney, Agent, or Firm* — Maldjian Law Group LLC; John Maldjian; Alexander D. Walter

(57) ABSTRACT

A method is disclosed that enables the monitoring of a diverse set of both real-time and non-real-time communication streams, as well as the aggregation of information related to those streams into a collective dialog. A server of the illustrative embodiment continually performs an aggregation of events that are related to media streams, applications, and presenter and participant actions, into a particular scope of communication. Index entries, which are indicia to events, are created by things that presenters and participants are doing already, such as posting a meeting agenda inviting participants, posting a presentation or document, transitioning from one slide or page to another, participants speaking alternately during a meeting or presentation, and so forth. The server uses the indicia to then perform processing across information flows associated with the communication streams.

19 Claims, 4 Drawing Sheets

AGGREGATION OF MULTIPLE INFORMATION FLOWS WITH INDEX PROCESSING

FIELD OF THE INVENTION

The present invention relates to telecommunications in general, and, more particularly, to unified communications.

BACKGROUND OF THE INVENTION

Unified communications (UC) is the integration of real-time communication services such as instant messaging (IM), presence information, Internet Protocol (IP) telephony, video conferencing, call control, and speech control with non real-time communication services such as integrated voicemail, email, Short-Message Service (SMS), fax, and so forth. Additionally, unified communications enables an individual to send a message on one medium and receive on another.

Recordings of real-time communications such as teleconferences or calls are usually available for an entire call or conference. Likewise, records of non real-time communications such as email are stored electronically and are readily accessible, at least until those records are archived or deleted from a file server. Some telecommunications products in the prior art feature the use of time codes within a real-time recording, in order to access particular portions of the conference or call. Each time code is a more-or-less-arbitrarily-chosen reference value that enables the temporal correlation of one type of media associated with the recording, such as images, with another type of media associated with the recording, such as audio. The time code might be represented, for example, in an hour: minute:second.frame format.

Products also exist that feature synchronized operations on multiple media streams using the time codes. Other products are capable of adding time codes or other pointers such as keyword recognition of a speech-to-text transcript of the audio stream.

SUMMARY OF THE INVENTION

The present invention enables the monitoring of a diverse set of both real-time and non-real-time communication streams, as well as the aggregation of information related to those streams into a collective dialog. A server of the illustrative embodiment continually performs an aggregation of events that are related to media streams, applications, and presenter and participant actions, into a particular scope of communication. Index entries, which are indicia to events, are created by things that presenters and participants are doing already, such as posting a meeting agenda inviting participants, posting a presentation or document, transitioning from one slide or page to another, participants speaking alternately during a meeting or presentation, and so forth. Index entries can also be explicitly created by users or by software agents. The server uses the indicia to then perform processing across information flows that are associated with the communication streams.

All of these occurring events provide a semantically rich and useful index to support capabilities such as searching, visualization, replay, extraction, etc. of voice, video, images, and text, as well as any other types of media that are being exchanged over time. In accordance with the illustrative embodiment, one way to process related media streams, which can be considered as flows of information, takes place as described here. First, the server of the illustrative embodiment receives one or more series of indicia to events occurring as part of one or more information flows. The server also receives a specified value of a specified search characteristic. The server searches across the information flows and finds a first indicium from a first series of indicia and a second indicium from a second series of indicia, based on the specified search value. The server then performs cross-flow processing across the underlying information flows based on the first and second indicia. Finally, the server presents one or more processed information flows, or related metadata, based on the processed flows.

In one type of the cross-flow processing mentioned above, the server can synchronize the advance of slides by the presenter of those slides or to open new media or applications for either reference or presentation purposes. Alternatively, a user can search related communication sessions about similar topics based on the communication event indicia of the illustrative embodiment. Or by creating an index of event metadata, a user can choose to go back later to a particular portion of the communication session and access only those events that are important to the user.

In some embodiments, during or after a communications dialog or meeting, the user can choose to allow all information flows to be played back in synchronicity, or to detach one flow from the others and manually control it. For example, the user could continue listening to the audio and video streams, but detach a document stream and then manually advance the pages, slides, or sheets in that document. In the same context, the user could select a specific subset of the flows or only those flows that require specific media types. For example, the user could choose to display the document and instant messaging streams, but not to activate the video and audio streams.

The illustrative embodiment of the present invention comprises: receiving, at a data-processing system, i) a first series of indicia to events occurring as part of a first information flow that is represented by a first source, ii) a second series of indicia to events occurring as part of a second information flow that is represented by a second source, and iii) a specified value of a specified characteristic from a third source; finding a first indicium from the first series and a second indicium from the second series, based on the specified value being the same for both the first indicium and the second indicium; and synchronizing temporally the first information flow and the second information flow with each other, based on the finding of the first indicium and the second indicium.

DETAILED DESCRIPTION

Figure 1:
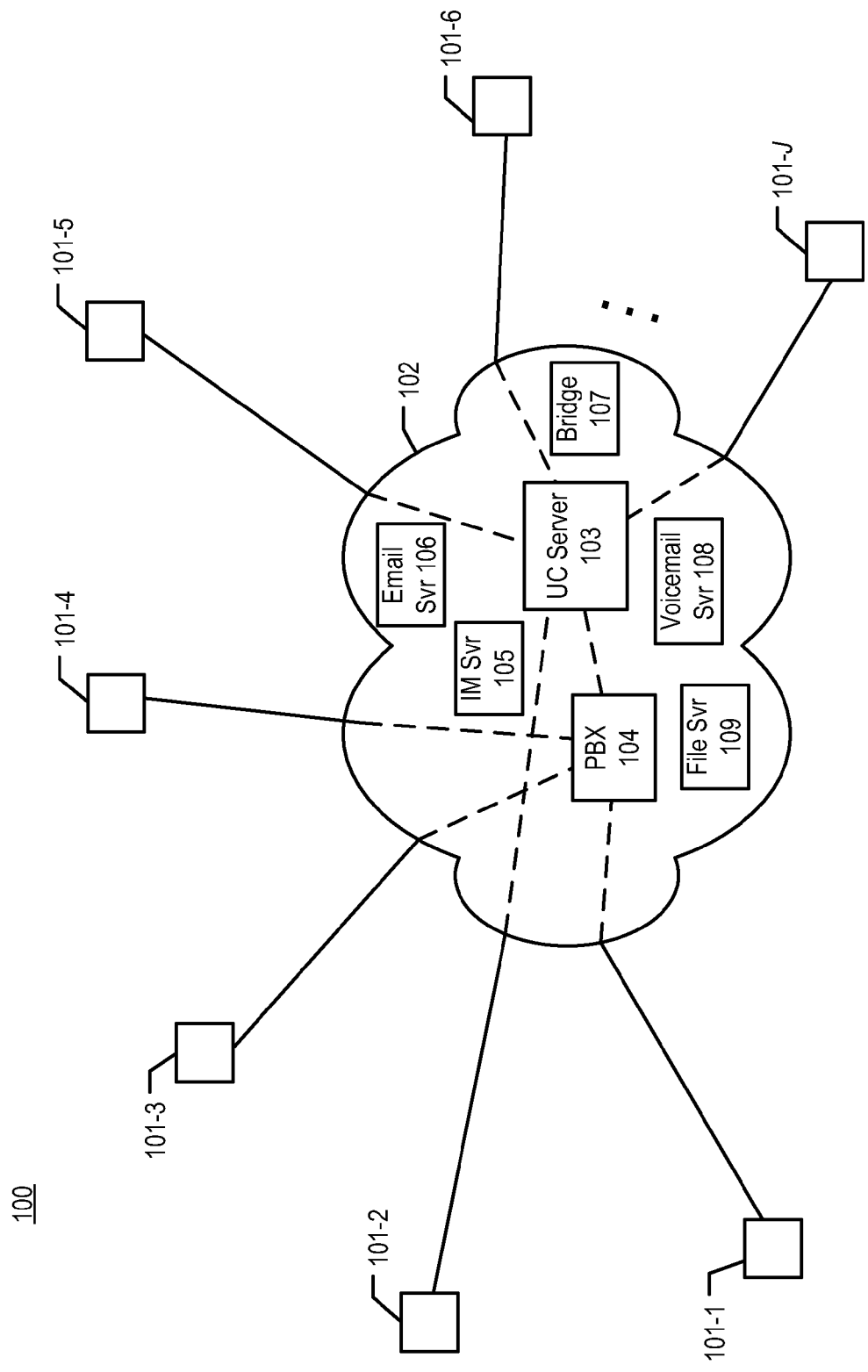
FIG. 1 depicts a schematic diagram of telecommunications system 100, in accordance with the illustrative embodiment of the present invention.

FIG. 1 depicts a schematic diagram of telecommunications system 100, in accordance with the illustrative embodiment of the present invention. System 100 comprises telecommunications endpoints 101-1 through 101-J, wherein J is an integer greater than one; telecommunications network 102; unified communications (UC) server 103; private branch exchange (PBX) 104; and servers 105, 106, 107, 108, and 109.

Telecommunications endpoint 101-*j*, where j has a value between 1 and J, inclusive, is a device that is capable of handling, for its user, a telephone call or other type of communication session, or both. Endpoint 101-*j* can be a cellular phone, a conference phone (i.e., "speakerphone"), a deskset, a computer with or without a resident softphone, or some other type of telecommunications appliance that is capable of exchanging voice and/or other communication signals. Endpoint 101-*j* is able to contact, or to be contacted by, another endpoint or device within telecommunications system 100.

Some of endpoints 101-1 through 101-J are endpoints that are tied to a private-branch exchange (PBX), or other type of telecommunications exchange, switch, or server. For example, some or all of the endpoints can be desksets in an office enterprise network for which telecommunications service is enabled by private-branch exchange 104. In any event, it will be clear to those skilled in the art how to make and use telecommunications endpoint 101-*j*.

Other servers depicted in FIG. 1 support different types of communication. Instant-Messaging (IM) server 105 enables the users of one or more of the endpoints to communicate with each other through instant messaging. Email server 106 enables the users of one or more of the endpoints to communicate with each other through email messages. Teleconference bridge 107 enables the users of one or more of the endpoints to communicate with each other as part of a teleconference session. Voicemail server 108 enables the endpoint users to leave voicemail messages for other users, in which the messages are retrievable from endpoints. File server 109 enables the users of one or more of the endpoints to both save and retrieve electronic documents such as presentation slides and text documents. As those who are skilled in the art will appreciate, a different complement of telecommunications servers may exist within telecommunications system 100.

Telecommunications network 102 provides the connectivity among endpoints 101-1 through 101-J, and enables the transport and control of communications signals between two or more endpoints per session. For reasons of clarity only a subset of the connectivity is depicted, as dashed lines; however, network 102 also enables the transport of communications signals between the endpoints and the telecommunications exchanges, switches, and servers in system 100. The communications signals convey different types of media such as audio, video, imaging, text, and so forth. To this end, network 102 comprises one or more interconnected data-processing systems such as switches, servers, routers, and gateways, as are well-known in the art.

In accordance with the illustrative embodiment, network 102 comprises an Internet Protocol-based (IP-based) network, as is known in art, for the purpose of transporting voice signals. Although network 102 in the illustrative embodiment comprises a Voice-over-IP (VoIP) service provider's network, network 102 could alternatively or additionally comprise another type of network such as the Internet, some other type of IP-based network, or some other type of packet-based network such as the Public Switched Telephone Network, as those who are skilled in the art will appreciate.

Unified communications server 103 is a data-processing system that monitors communication sessions, aggregates events related to those sessions, and performs at least some of the tasks of the illustrative embodiment, which tasks are described below and with respect to FIGS. 3 and 4. It will be clear, however, to those skilled in the art how to make and use alternative embodiments of the present invention in which a different data-processing system than server 103 performs the tasks of the illustrative embodiment. For example, in some alternative embodiments, private-branch exchange 104 might perform some or all of the tasks described herein or another data-processing system not shown might perform some or all of the tasks.

Furthermore, it will be clear to those skilled in the art, after reading this specification, how to make and use embodiments of system 100 in which the monitoring of a communication session, and aggregation of events, is performed concurrently on behalf of one or more users, for each of one or more sessions being monitored.

In accordance with the illustrative embodiment, server 103 continually performs an aggregation of events that are related to media streams, applications, and presenter and participant actions, into a particular scope of communication. This aggregation enables a unified communications session to be indexed by multiple parallel events such as media events, topics of discussion, speakers communicating, actions taken or to be taken, and so forth. The index entries, which are referred to below as "indicia" to events, are created by things that presenters and participants are doing already, such as posting a meeting agenda inviting participants, posting a presentation or document, transitioning from one slide or page to another, participants speaking alternately during a meeting or presentation, and so forth. All of these events provide a semantically rich and useful index to support capabilities such as searching, visualization, replay, extraction, etc. of voice, video, images, and text, as well as any other types of media that are being exchanged over time.

Figure 2:
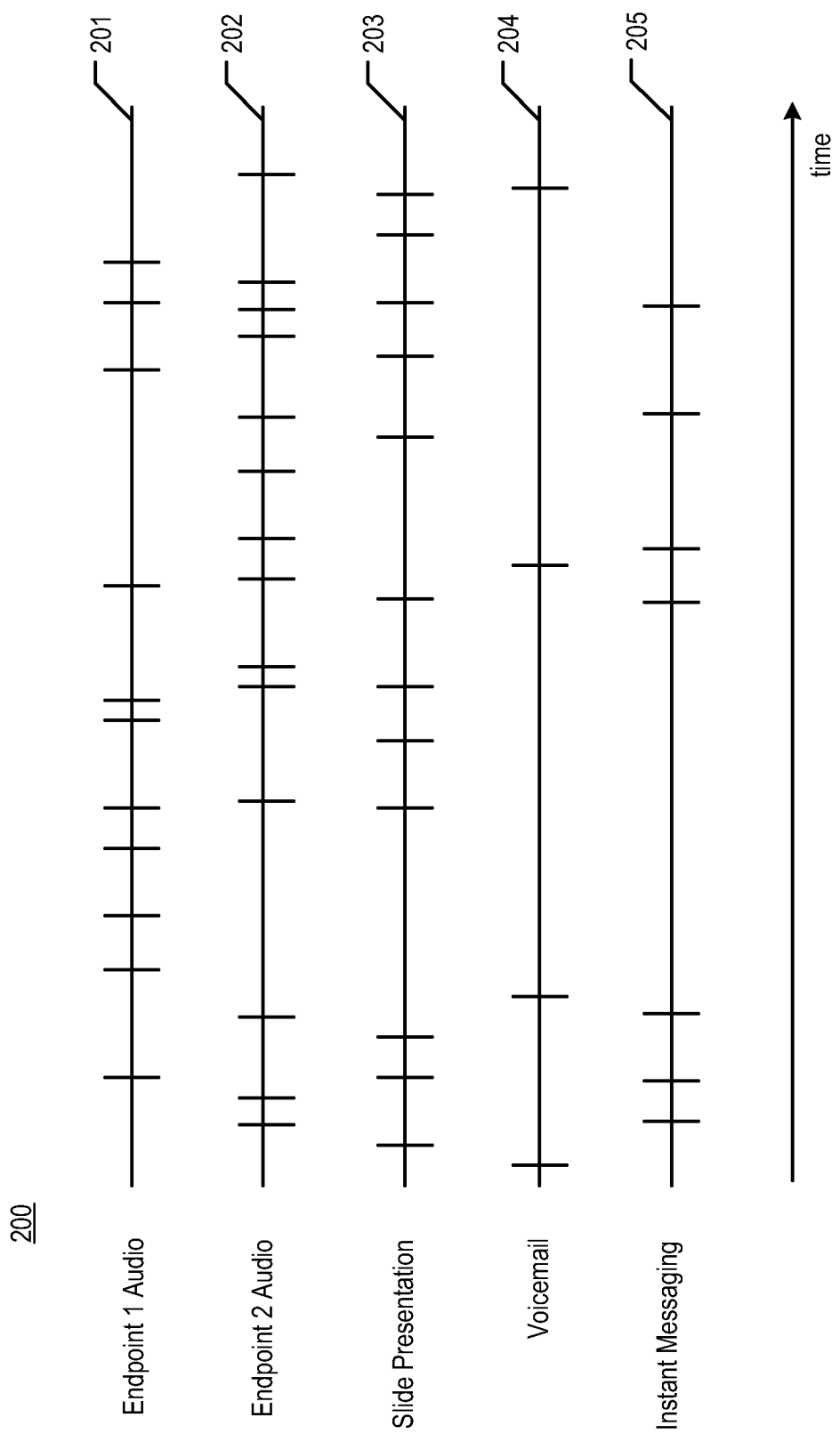
FIG. 2 depicts an example of the aggregation performed by server 103 within system 100.

FIG. 2 depicts an example of the aggregation performed by server 103, in accordance with the illustrative embodiment of the present invention. In particular, FIG. 2 shows a particular dialog, referred to as dialog 200, which is an aggregation of an illustrative set of related events stemming from various media streams. The different streams can be different types of media such as, while not being limited to:

i. an audio feed of a teleconference, where the source of the stream can be bridge 107 which is handling the teleconference, ii. other audio content, where the source is from an endpoint, iii. video content, where the source is from a server, iv. image content, where the source is from a server, and v. textual content, such as from an electronic document stored at a server.

As those who are skilled in the art will appreciate, other types of media are possible, in which those other types of media are possibly represented by other sources.

Each stream depicted in FIG. 2 is a "flow" of information, or an "information flow," where the flow has an associated series of indicia to events that are occurring as part of that flow, and where the flow is represented by a particular source. Information flow 201 is produced by a participant at a first endpoint in a communication session. Information flow 202 is produced by a participant at a second endpoint in the same communication session. Information flow 203 is made up of the content of an electronic document (e.g., a slide deck stored at a server, etc.) that is being used in the communication session. Information flow 204 is made up of the voicemails stored within a voicemail system, where the voicemails have been left by, or left for, one or more participants in the communication session. Information flow 205 is made up of the instant messages generated by one or more participants in the communication session. As those who are skilled in the art will appreciate, another combination of information flows can be aggregated in accordance with the illustrative embodiment.

Each of the information flows that are depicted has an associated series of indicia, shown by tick marks, to events occurring as part of that information flow. An "occurring" event can refer to an event having occurred or to an event that is scheduled to occur. As a result, the events occurring as part of an information flow can comprise one or more events that are known before those events are scheduled to occur. Some of the events can be created before a communication session occurs, such as i) the start time and end time in a scheduler application or ii) an agenda that is part of a presentation slide deck. Other events can rely on actions by presenters or participants, or both, as the communication session occurs and, as such, these events occur in real-time. Some of the events are explicit, such as the advance of slides being presented, a person starting to speak, or a message being sent, while others are implicit, such as a participant failing to advance slides because the participant is otherwise occupied or multitasking. As a result, the events occurring as part of an information flow can comprise an event that is based on a failure to do something expected.

In accordance with the illustrative embodiment of the present invention, each indicium might comprise a time code as is known in the art, which time code represents the time that an event occurred. The indicium might also comprise other attributes necessary to identify the location of the time-related information within the associated information flow—for example, the page and paragraph of a document, the slide in a presentation, or the sheet, row, and column in a spreadsheet. As those who are skilled in the art will appreciate, in some alternative embodiments, one or more indicia might not comprise time codes.

A source of an information flow can "represent" that flow in various ways such as, while not being limited to, transmitting the flow, storing the flow, creating or maintaining other data from which the flow can be derived, and so forth. In particular, each source might represent metadata that describe an information flow. As one example, the metadata of an information flow that comprises a sequence of presentation slides might describe i) the number of slides, ii) the time spent on each slide, iii) the number of words on each slide, iv) whether each slide has graphical content in addition to textual content, and so forth. As another example, the metadata of an information flow that comprises a sequence of utterances by a teleconference participant might describe i) when the person started to speak, ii) the amount of time the person spoke, iii) whether the person was asking a question, iv) the relationship of the person to the previous speaker, and so forth.

The information flows depicted in FIG. 2 are represented in the figure as being coincident in time with one another, for pedagogical purposes. However, the indicia of the underlying events are not necessarily stored in memory based on any dependency of one flow on another, as those who are skilled in the art will appreciate.

Figure 3:
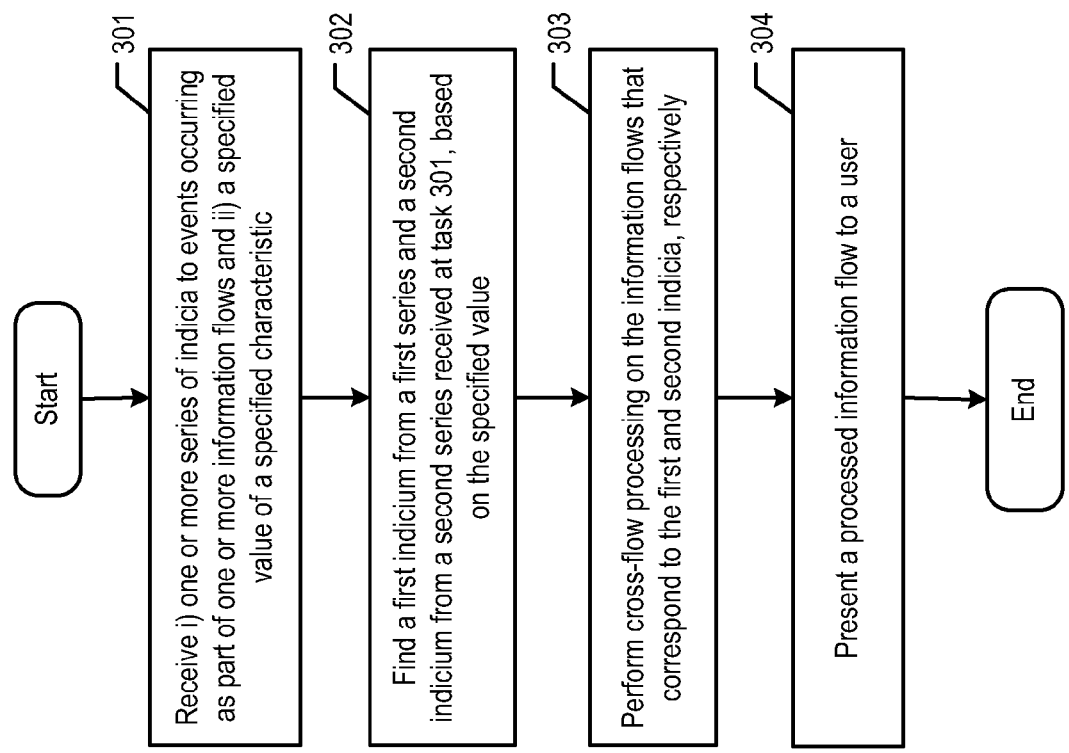
FIG. 3 depicts the main set of tasks performed by server 103 and related to the aggregation of information flows, in accordance with the illustrative embodiment of the present invention.
Figure 4:
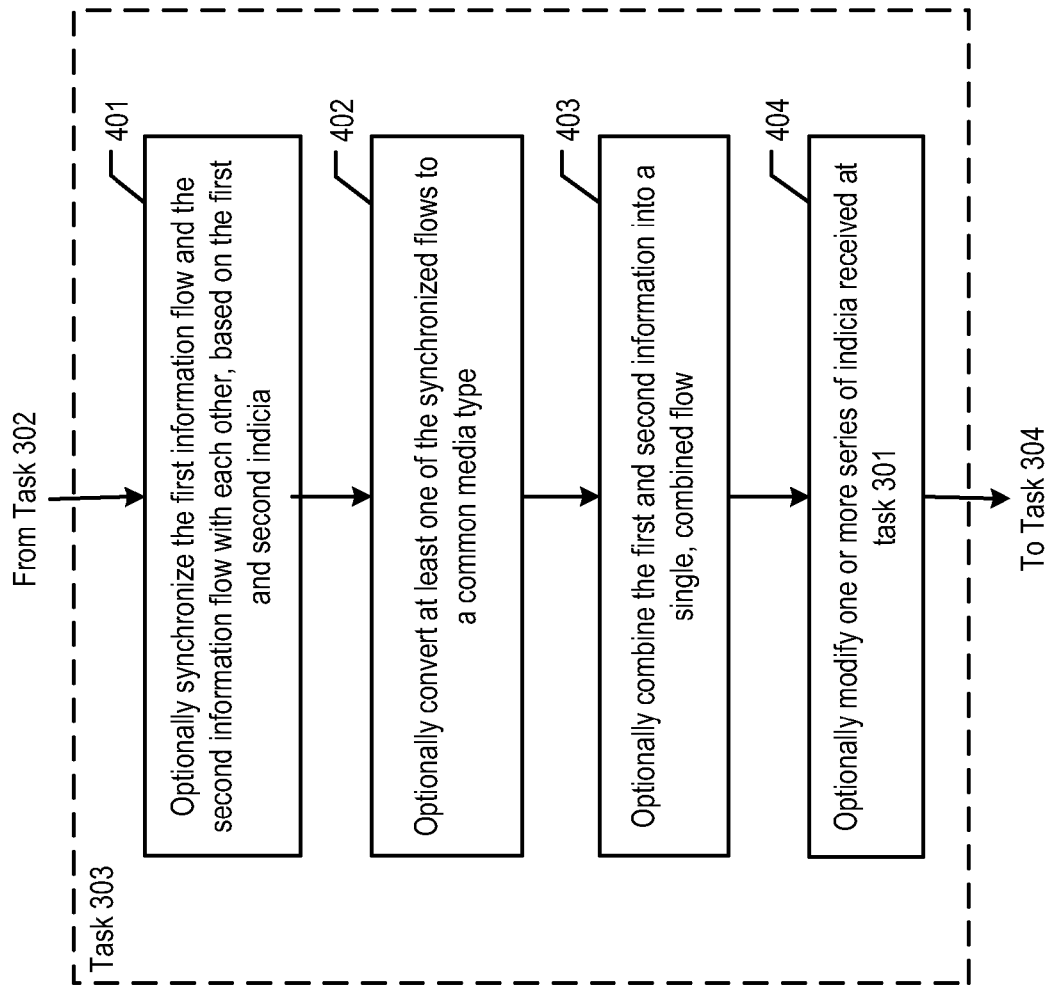
FIG. 4 depicts the tasks associated with performing inter-flow processing, as part of the aggregation of information flows.

FIGS. 3 and 4 depict flowcharts of salient tasks that are related to the aggregation of information flows by server 103, in accordance with the illustrative embodiment of the present invention. As those who are skilled in the art will appreciate, some of the tasks that appear in the flowcharts can be performed in parallel or in a different order than that depicted. Moreover, those who are skilled in the art will further appreciate that in some alternative embodiments of the present invention, only a subset of the depicted tasks are performed.

The tasks depicted in FIGS. 3 and 4 can be performed for a variety of applications. As a first example, the tasks can be part of an on-demand search and retrieval as requested by a particular user, such as a user who wants to retrieve the information flows related to a presentation that has already occurred. As a second example, the tasks can be part of an the construction of a master unified communications index that can function independently of the original information flows as represented by the media streams, applications, document storage facilities or databases, transcription facilities, media conversion products, or other independent products. Other applications of the disclosed tasks are possible, as those who are skilled in the art will appreciate.

FIG. 3 depicts the main set of tasks performed by server 103 and related to the aggregation of information flows. At task 301, server 103 receives one or more series of indicia to events occurring as part of one or more information flows. Each series of indicia corresponds to a single information flow. Each information flow is represented by a particular source such as, while not being limited to, one or more of endpoints 101-1 through 101-J; one or more of PBX 104 and servers 105-109; or sources that are not explicitly part of telecommunications system 100.

The source from which a series of indicia is obtained, or from which the underlying information flow is obtained, is either already adapted to produce such indicia or would utilize plug-in modules for each software application or telecommunications device involved in order to produce such indicia. These plug-in modules would facilitate integrating a new application into the context of the overall communication session. The plug-ins can, for example, allow slide presentation software (e.g., PowerPoint, etc.) to track which slide or which bullet is being displayed or presented, respectively, during a teleconference session, and make appropriate changes to the originally-published meeting agenda, as described below and with respect to task 404.

In some embodiments, server 103 also receives a specified value of a specified characteristic from another source. As one example, a specified characteristic can be based on a designation of a person such as a person's name, where the specified value would be a particular name. As other examples, the specified characteristic can be based on calendrical time, the participants of a specified teleconference, and so forth.

At task 302, server 103 searches for and finds a first indicium from a first series received at task 301 and a second indicium from a second series received at task 301. Server 103 finds the indicia based on using the specified value as part of one or more search criteria, where both the first indicium and the second indicium meet the search criteria. For example, if the specified characteristic is "person's name" and the specified value is "Bob," then server 103 finds indicia to events in which the indicia are related to the name Bob. An indicium can correspond to, while not being limited to:

i. a moment at which Bob participated in a teleconference session,
 ii. a moment at which Bob's name was uttered during the session,
 iii. a moment at which someone else reacted to Bob's statements or responded to Bob's questions,
 iv. a moment at which a presentation slide referring to Bob was presented,
 v. a moment at which Bob left voicemail for someone,
 vi. a moment at which someone left voicemail for Bob, and
 vii. a moment at which Bob exchanged instant messages with someone.

As those who are skilled in the art will appreciate, an indicium can correspond to innumerable other events not listed above.

For pedagogical purposes, the illustrative embodiment features a search for indicia involving two information flows.

However, it will be clear to those skilled in the art, after reading this specification, how to make and use embodiments in which more than two information flows are searched for indicia, and in which possibly more than one indicium from an information flow is found.

At task 303, server 103 performs cross-flow processing in accordance with the illustrative embodiment. The subtasks associated with task 303 are described below and with respect to FIG. 4.

At task 304, server 103 presents one or more processed information flows to a user, such as the user who specified the characteristic and value, which value was received at task 301. Server 103 can transmit the processed information flows to the user's endpoint, which can then display the video, images, or text, or play the audio associated with the processed flow.

FIG. 4 depicts the tasks associated with performing the cross-flow processing of task 303. At task 401, server 103 optionally synchronizes, or otherwise correlates, i) the first information flow associated with the first indicium at task 302 with ii) the second information flow associated with the second indicium at task 302.

For example, server can synchronize two flows in time, where the first information flow is audio from a teleconference and the second information flow is textual, based on aligning the flows by using time codes associated with the related indicia that server 103 found at task 302. However, it is not mandatory for the first information flow to be audio from a teleconference; for example, the communication could be entirely textual, either asynchronously or in real-time, or based on another type of media as described above and with respect to FIG. 2. A teleconference is merely one context where a set of information flows may be automatically determined to be overlapping in time and related; however, any arbitrary set of information flows may use additional information such as records in a business application or workflow system in order to correlate a set of information flows. Furthermore, it is not required that any two information flows actually overlap each other in time, only that they occur within a range of time of arbitrary units such as milliseconds, minutes, or even years.

At task 402, server 103 optionally converts at least one of the synchronized flows to a common type of media. The converted-to media type can be the media type of one of the original flows, or it can be yet a different type. For example, if the first information flow is audio in type, where the audio is based on an audio feed from a teleconference session, and the second information flow comprises a sequence of instant messages (i.e., is text in media type), then server 103 can perform audio-to-text conversion on the first flow, in order to allow two or more flows to be presented textually, or to facilitate textual indexing of keywords or references to entities such as persons, products, companies, or services. Indexing textually across multiple flows permits correspondences to be found between time-related portions of multiple flows where the portions are between two indicia.

Conversely, an information flow that originally contains text, or that has been converted to text, may then be converted to stored audio to facilitate playback, for example, to a visually impaired user or to a user interacting with an audio device such as a cell phone. Keywords related to indicia may be entered or spoken and used to find a relevant portion of a communications dialog, and then one of more related portions of the different information flows may be played back in audio form. The facility to control playback across multiple information flows, related by time or other indicia, in a communications dialog allows such a user to play back the original audio stream, the text on the corresponding slide, or the instant messages.

At task 403, server 103 optionally combines the two information flows into a single, combined flow, based on the finding of the indicia at task 302. For example, if both the first and second information flows are audio streams, server 103 can combine both audio streams into a single, combined audio stream, based on having found the indicia at task 302 with which to align the flows.

At task 404, server 103 optionally modifies one or more series of indicia that were received at task 301. For example, server 103 can first obtain the series of indicia represented by one or both of i) a published meeting invitation contained in a first electronic document or file, and ii) the initial structure or schedule of the communication session as taken from a published meeting agenda contained in a second electronic document or file, and then supplement and/or modify those indicia by the events that occur during the actual teleconference session. The actual events that occur are reflected as part of one or more media feeds (e.g., audio feed, slide image feed, etc.) of the teleconference.

The modified indicia can then be presented to a user in accordance with task 304 of the illustrative embodiment. For example, the modified indicia can be presented to the user as part of a modified agenda that reflects the actual running times of each of the presentations actually made. Additionally, at least a portion of the media feed can also be presented the user, such that at least one indicium of the raw information flow (e.g., the audio or image feed of the teleconference) is synchronized temporally with at least one indicium of the modified series. This enables each topic from the modified agenda to be displayed, along with possibly the metadata of the corresponding presentation, while the corresponding portion of the media feed is being presented to the user.

In some embodiments, instead of processing two or more information flows that result in a modified flow or flows, server 103 can process a first information flow and the metadata that describe a second information flow. For example, the metadata of a second information flow that comprises a sequence of presentation slides might describe i) the number of slides, ii) the time spent on each slide, iii) the number of words on each slide, iv) whether each slide has graphical content in addition to textual content, and so forth. In accordance with the illustrative embodiment, server 103 can, for example, combine the first information flow, such as the audio track of a teleconference session, with a commentary of the presentation slides used on the conference call, where the commentary is based on the metadata. The commentary might contain audio comments such as "This slide has graphics" or "This slide took 20 minutes to present."

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, at a data-processing system:
   i) a first series of indicia to events occurring as part of a first information flow that is represented by a first source, the first series of indicia derived from information or action content of the first information flow, wherein the first series of indicia is separate from the first information flow;
   ii) a second series of indicia to events occurring as part of a second information flow that is represented by a second source, the second series of indicia derived from information or action content of the second information flow, wherein the second series of indicia is separate from the second information flow; and iii) a specified value of a specified characteristic from a third source;

finding a first indicium from the first series and a second indicium from the second series, based on the specified value being the same for both the first indicium and the second indicium;

synchronizing temporally the first information flow and the second information flow with each other, based on the finding of the first indicium and the second indicium;

converting at least one of the first and second information flows to a common media type; and aggregating the first information flow and the second information flow to produce an indexed unified communication session, wherein the first information flow is an audio feed of a teleconference, wherein the first source is a teleconference bridge that handles the teleconference, and wherein the events occurring as part of the first information flow comprise a first event that is based on an absence of an expected action in the first information flow.

2. The method of claim 1 wherein the second information flow is non-audio.

3. The method of claim 2 wherein the second information flow is textual.

4. The method of claim 3 wherein the second source is an electronic document.

5. The method of claim 1 wherein the specified characteristic is based on a designation of a person.

6. The method of claim 1 wherein the specified characteristic is based on calendrical time.

7. The method of claim 1 wherein the specified characteristic is based on an identity of participants of a specified teleconference.

8. The method of claim 1 further comprising presenting at least one synchronized information flow to the third source, wherein the at least one synchronized information flow results from the synchronizing of the first and second information flow.

9. The method of claim 8 further comprising converting at least a portion of the first information flow to the same type of media as that of the second information flow, wherein the at least one synchronized information flow is based on the converting.

10. The method of claim 1 wherein the events occurring as part of the first information flow comprise a first event that is known before the first event is scheduled to occur.

11. The method of claim 1 further comprising combining the first information flow with metadata that describe the second information flow, based on the finding of the first indicium and the second indicium.

12. The method of claim 1, further comprising combining the first and second information flows into a single, combined information flow.

13. The method of claim 1, where indicia are created based upon actions by at least one of presenters and participants of a respective information flow.

14. The method of claim 1, wherein information or action content of at least one of the first information flow and the second information flow comprises actions by at least one of a presenter and a participant.

15. The method of claim 1, wherein information or action content of at least one of the first information flow and the second information flow comprises participation by a participant in at least one of the first information flow and the second information flow.

16. The method of claim 1, wherein information or action content of at least one of the first information flow and the second information flow comprises mention of a person during at least one of the first information flow and the second information flow.

17. The method of claim 1, wherein information or action content of at least one of the first information flow and the second information flow comprises reaction by other participants during at least one of the first information flow and the second information flow.

18. The method of claim 1, wherein information or action content of at least one of the first information flow and the second information flow comprises content of a presentation slide during at least one of the first information flow and the second information flow.

19. The method of claim 1, wherein information or action content of at least one of the first information flow and the second information flow comprises an event that occurs during at least one of the first information flow and the second information flow.

* * * * *